(12) United States Patent
Ohara (10) Patent No.: US 8,042,146 B2
(45) Date of Patent: Oct. 18, 2011

(54) APPARATUS AND METHOD FOR GENERATING AN ELECTRONIC DOCUMENT, AND STORAGE MEDIUM

(75) Inventor: Hiromi Ohara, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1300 days.

(21) Appl. No.: 11/486,675

(22) Filed: Jul. 14, 2006

(65) Prior Publication Data

US 2007/0136292 A1      Jun. 14, 2007

(30) Foreign Application Priority Data

Dec. 6, 2005 (JP) ................................. 2005-352064

(51) Int. Cl.
G06F 21/24 (2006.01)
(52) U.S. Cl. ................................. 726/1; 726/26; 726/27
(58) Field of Classification Search .......... 726/1, 26–29; 707/9
See application file for complete search history.

(56) References Cited

U.S. PATENT DOCUMENTS

| | | | |
|---|---|---|---|
| 6,609,200 B2 * | 8/2003 | Anderson et al. ............. | 713/176 |
| 7,035,910 B1 * | 4/2006 | Dutta et al. .................... | 709/217 |
| 7,103,835 B1 | 9/2006 | Yankovich et al. | |
| 2001/0049705 A1 | 12/2001 | Murase et al. | |
| 2003/0036925 A1 * | 2/2003 | Miller ............................. | 705/2 |
| 2003/0105950 A1 | 6/2003 | Hirano et al. | |
| 2004/0125402 A1 | 7/2004 | Kanai et al. | |
| 2004/0128555 A1 | 7/2004 | Saitoh et al. | |
| 2004/0254884 A1 * | 12/2004 | Haber et al. ................... | 705/51 |
| 2004/0263870 A1 | 12/2004 | Itoh et al. | |
| 2005/0021980 A1 | 1/2005 | Kanai | |
| 2005/0028006 A1 * | 2/2005 | Leser et al. ................... | 713/200 |
| 2005/0071658 A1 | 3/2005 | Nath et al. | |
| 2006/0129746 A1 | 6/2006 | Porter | |
| 2007/0033154 A1 * | 2/2007 | Trainum et al. ................... | 707/1 |

FOREIGN PATENT DOCUMENTS

| | | |
|---|---|---|
| JP | 6004530 | 1/1994 |
| JP | 2000306026 | 11/2000 |
| JP | 2001290780 | 10/2001 |
| JP | 2001325249 | 11/2001 |
| JP | 2002108818 | 4/2002 |
| JP | 2002109450 | 4/2002 |
| JP | 2004234070 | 8/2004 |
| JP | 2005301574 | 10/2005 |
| WO | 0188750 | 11/2001 |

OTHER PUBLICATIONS

Bertino et al., Specifying and enforcing access control policies for XML document sources, 2000, pp. 139-151.*

(Continued)

*Primary Examiner* — Minh Dinh
(74) *Attorney, Agent, or Firm* — Gesmer Updegrove LLP (57) ABSTRACT

An electronic document generating apparatus comprises a generating unit that assigns a value to a variable area in a source electronic document for defining a format, to newly generate an electronic document, and a setting unit that establishes, independently of the generated electronic document, security policy information which defines an operation right to the generated electronic document, on the basis of security policy information associated with the source electronic document and defining an operation right to the source electronic document, and associates the established security policy information with the generated electronic document.

18 Claims, 12 Drawing Sheets

OTHER PUBLICATIONS

Bertino et al., "Securing XML Documents with Author-X"; Internet Computing, IEEE, vol. 5, Issue 3, May-Jun. 2001, pp. 21-31.

Bhatti et al., "XML-Based Specification for Web Services Document Security"; Computer, vol. 37, Issue 4, Apr. 2004; pp. 41-49.

Hiromi Ohara; Office Action mailed from the United States Patent and Trademark Office on Nov. 10, 2008 for corresponding U.S. Appl. No. 11/454,504.

U.S. Appl. No. 11/454,504, filed on Jun. 16, 2006, Hiromi Ohara., Express Mail No. EV810686925US.

US Office Action mailed on May 27, 2009 corresponding to U.S. Appl. No. 11/454,504.

US Office Action issued on Sep. 9, 2009 corresponding to U.S. Appl. No. 11/454,504.

Japanese Notice of Grounds for Rejection issued on Mar. 29, 2011, in connection with corresponding JP Application No. 2005-352064, with English translation thereof.

Hiroyuki Nemoto, Prohibited Techniques and Taboos in Windows Network, Prohibited Techniques 2: Don't Move Files of Server Unnecessarily, Nikkei Network, vol. 62, Japan: Nikkei Business Publication, Inc., May 22, 2005 vol. 62, pp. 92-93.

Notice of Grounds for Rejection issued on May 10, 2011 in connection with JP Application No. 2006-056100 and partial English translation thereof.

* cited by examiner

APPARATUS AND METHOD FOR GENERATING AN ELECTRONIC DOCUMENT, AND STORAGE MEDIUM

BACKGROUND

1. Technical Field

The present invention relates to a technique for generating an electronic document, and more particularly to a technology for ensuring security of a generated electronic document.

2. Related Art

Figure 14:
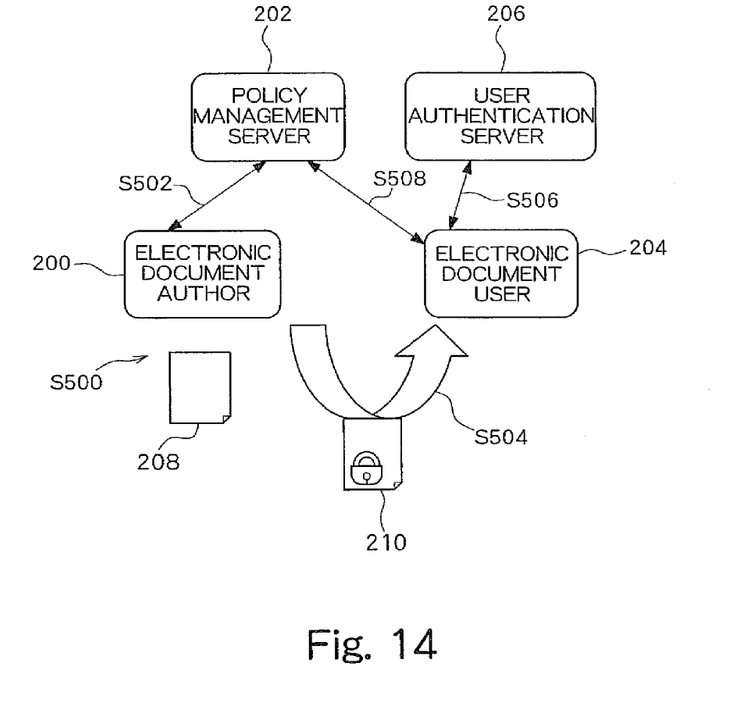
FIG. 14 shows a usage pattern example of the security policy.

Meanwhile, a technique of electronic document management using a security policy in which operation rights (read, write, copy, print, or other rights) of users are written has been known. FIG. 14 is a diagram explaining an outline of the technique, and depicts a state of processing performed among an electronic document author 200 generating an electronic document, a policy management server 202 managing security policy, an electronic document user 204 using the generated electronic document, and a user authentication server 206 implementing user authentication.

The electronic document author 200 generates a new electronic document 208 (S500). As a security policy to be assigned to the electronic document 208, the electronic document author 200 selects one of security policies registered in the policy management server 202 or creates a new security policy. Then, the electronic document author 200 associates the selected or created security policy with the electronic document 208 and registers the security policy in the policy management server 202 (S502). The electronic document 208 associated with the security policy is referred to as an electronic document 210 and is distributed to the electronic document user 204 by a method such as transmission via e-mail or downloading (S504). Because the electronic document 210 to be distributed to the electronic document user 204 is associated with the security policy registered in the policy management server 202, the electronic document 210 is in a state locked by a "key" for access control. When the electronic document user 204 attempts to access the distributed electronic document 210, user authentication is performed in the user authentication server 206 (S506), and operation rights of the electronic document user 204 are checked through an inquiry to the policy management server 202 (S508). Thus, the electronic document user 204 can use the electronic document 210 only when the electronic document user 204 has a predetermined right.

In the above-described technique, the electronic document and the security policy are individually managed, thereby enabling the manager to modify the security policy after distribution of the electronic document. In other words, the manager can control when, by whom, and how processing is performed on which electronic document.

SUMMARY

An electronic document generating apparatus comprises a generating unit that assigns a value to a variable area in a source electronic document for defining a format for newly generating an electronic document, and a setting unit that establishes, independently of the generated electronic document, security policy information which defines an operation right to the generated electronic document, on the basis of security policy information associated with the source electronic document and defining an operation right to the source electronic document, and associates the established security policy information with the generated electronic document.

BRIEF DESCRIPTION OF THE DRAWINGS

Embodiments of the present invention will be described in detail by reference to the following figures, wherein.

DETAILED DESCRIPTION

Figure 1:
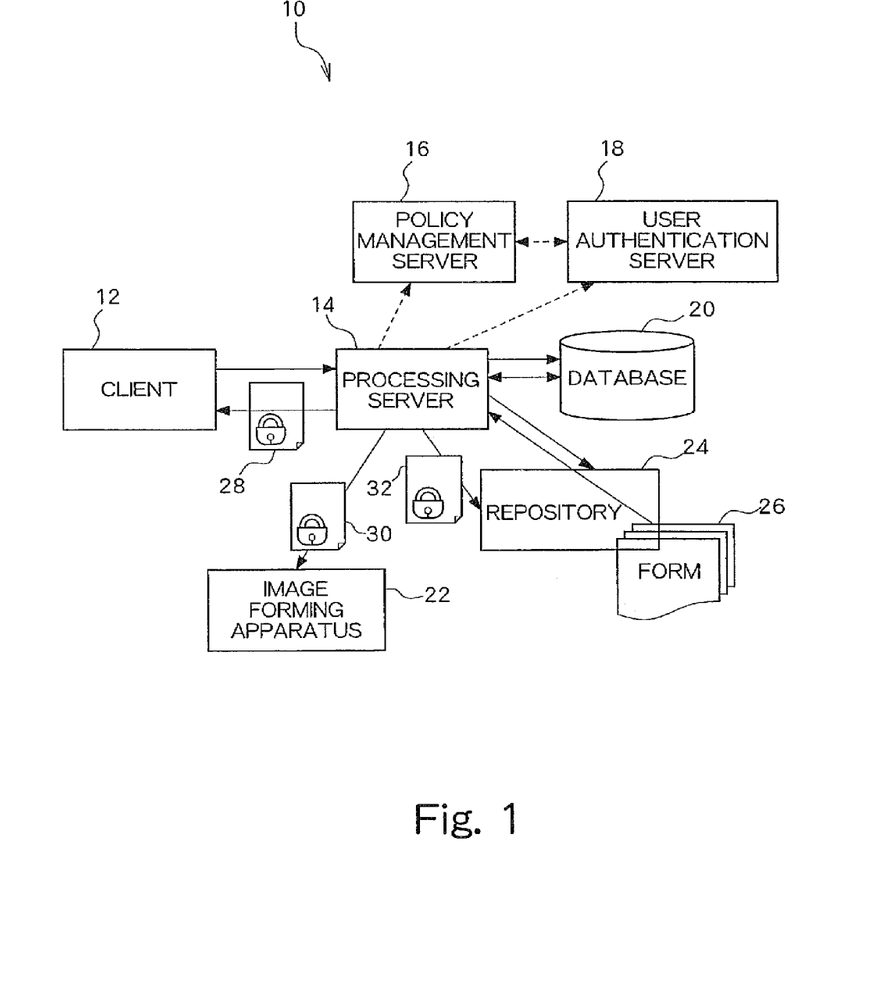
FIG. 1 schematically shows an example apparatus configuration in an electronic document management system.

FIG. 1 is a drawing for explaining a schematic configuration of an electronic document management system 10 according to an exemplary embodiment of the present invention. The electronic document management system 10 includes a client 12, a processing server 14, a policy management server 16, a user authentication server 18, a database 20, an image forming apparatus 22, and a repository 24.

The client 12 is a terminal device used by a user. In accordance with instructions from the user, the client 12 requests the processing server 14 to generate, save, or print an electronic document. The client 12 may be implemented by any of various kinds of apparatus, such as a personal computer (PC), or a multi-function machine (an apparatus having multiple image processing functions, such as a printer function, a scanner function, and the like) connected to a network.

The processing server 14 is a key component in terms of controlling and processing in this system, and may be configured by a PC, an image forming apparatus, or the like. To implement a request input from the client 12, the processing server 14 causes each component of the system to perform processing in addition to generating an electronic document in itself. Specifically, the processing server 14 combines, for example, a form 26 obtained from the repository 24 with information retrieved from the database 20 to generate the electronic document, and performs processing on the generated electronic document, such as transmission to the client 12, printing in the image forming apparatus 22, or storing in the repository 24. During the course of such processing, the processing server 14 makes access to the user authentication server 18 for authenticating a user and makes access to the policy management server 16 for registering or checking a security policy of the electronic document, to thereby realize a necessary degree of security.

The policy management server 16 is an apparatus for storing security policies associated with the electronic documents, and the user authentication server 18 is a server for authenticating, by means of an authentication system, such as public key cryptography, a user who is attempting to gain access to the system. The database 20 stores various types of data, such as text data, numerical values, images, and sounds.

The image forming apparatus 22 composed of a printer, a multifunction machine, or the like prints the electronic document in accordance with an instruction from the processing server 14. The repository 24 stores the electronic documents generated in accordance with a user demand, and a form 26 which is a template for generating the electronic document.

Figure 2:
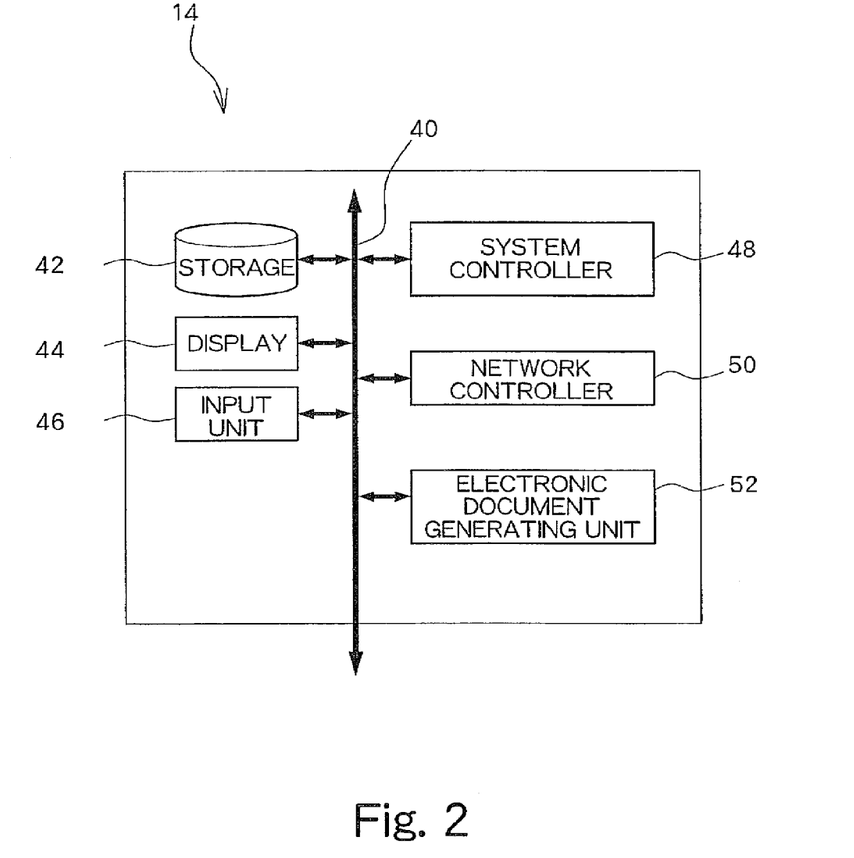
FIG. 2 schematically shows an example configuration of a processing server.

FIG. 2 is a drawing for explaining an example configuration of the processing server 14. The processing server 14 is provided with a network 40 for enabling internal and external data transmission. The network 40 serves to connect a storage device 42, a display 44, an input device 46, a system controller 48, a network controller 50, and an electronic document generating unit 52.

The storage device 42 is a device composed of a semiconductor memory, a hard disk, and other components to implement short- or long-term storage of the electronic documents, programs, and other data items. The display 44 may be a liquid crystal display, a cathode ray tube (CRT), or the like for displaying the electronic documents or details of the instruction. The input device 46 may be configured by a keyboard, a touch panel, or the like, to accept instructions from a user. In addition, the input device 46 may also function as the client 12 shown in FIG. 1. Upon receipt of an instruction input by a user via the input device 46 or via the network 40, the system controller 48 controls operation of each component in the processing server 14. The network controller 50, meanwhile, controls a timing of transmitting data to the network 40. The electronic document generating unit 52 generates a new electronic document through use of the form 26 shown in FIG. 1.

The components of the electronic document management system 10 shown in FIGS. 1 and 2 may be implemented in a variety of ways. For example, a single high-performance multifunction machine may be used to construct the electronic document management system 10. Alternatively, devices, such as PCs, and/or multifunction machines, connected directly to each other or connected via a network may be used to construct the electronic document management system 10. In addition, the repository 24, for example, may be dispersedly provided in storage sections of multiple devices, and, similarly, one or more desired components of the electronic document management system 10 may be distributed over multiple devices.

Next, by reference to FIGS. 3 to 8, the electronic document handled in the above-described electronic document management system 10 will be described. In the following description, a quote, which is one of electronic business statements and reports, is used as an example of the electronic document.

Figure 3:
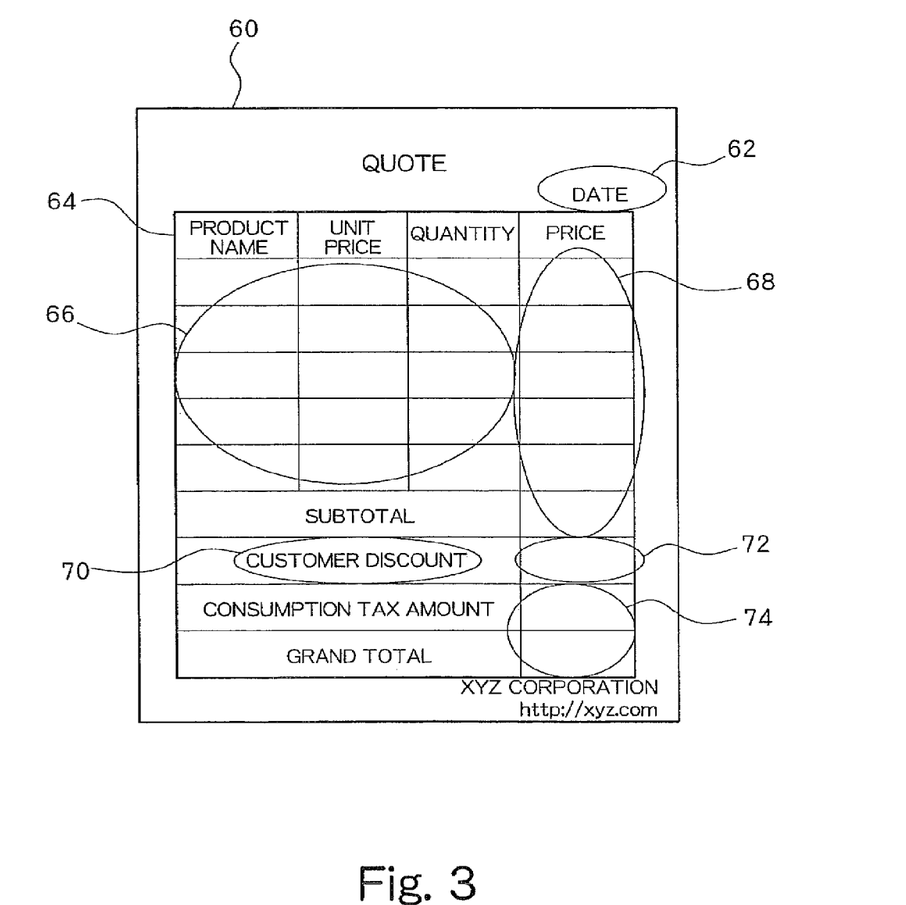
FIG. 3 is a diagram of a quote form shown in a print image format.

In FIG. 3, a form 60 used for generating a quote is shown in a state representing a printed result. The form 60 includes a date field 62 in which an issuing date of the form 60 is entered, a table 64 for indicating a cost estimation result, and other items. The table 64 has columns for names, unit prices, and quantity of products serving as subjects of price quotation, as well as prices calculated for the respective products. The table 64 further includes fields for representing data items of a subtotal of the prices for all the products, a customer discount indicating a rate of discount applied to a customer, an amount of consumption tax, and a grand total of all the fields.

When a quote is generated, specific values are entered in the fields of the form 60. For example, a generation date of the form 60 is automatically input in the date field 62, and information on individual products is entered in cells 66 for the names, unit prices, and quantities of products. Further, calculation results obtained by calculation based on the information entered in the cells 66 are posted in cells 68. The customer discount 70 is an optional item to be generated only when a discount is applied, and the title "customer discount" may be changed optionally to another title, such as "campaign discount rate." In a cell 72, an individual value customized for each customer or determined on the basis of a discount type is entered. Then, values calculated in accordance with the information entered in the above-described cells are input in cells 74 representing the amount of consumption tax and the grand total.

FIGS. 4 to 8 show examples of electronic data used for materializing the form 60 shown in a print format in FIG. 3 and electronic data used for assigning values in the form 60.

Figure 4:
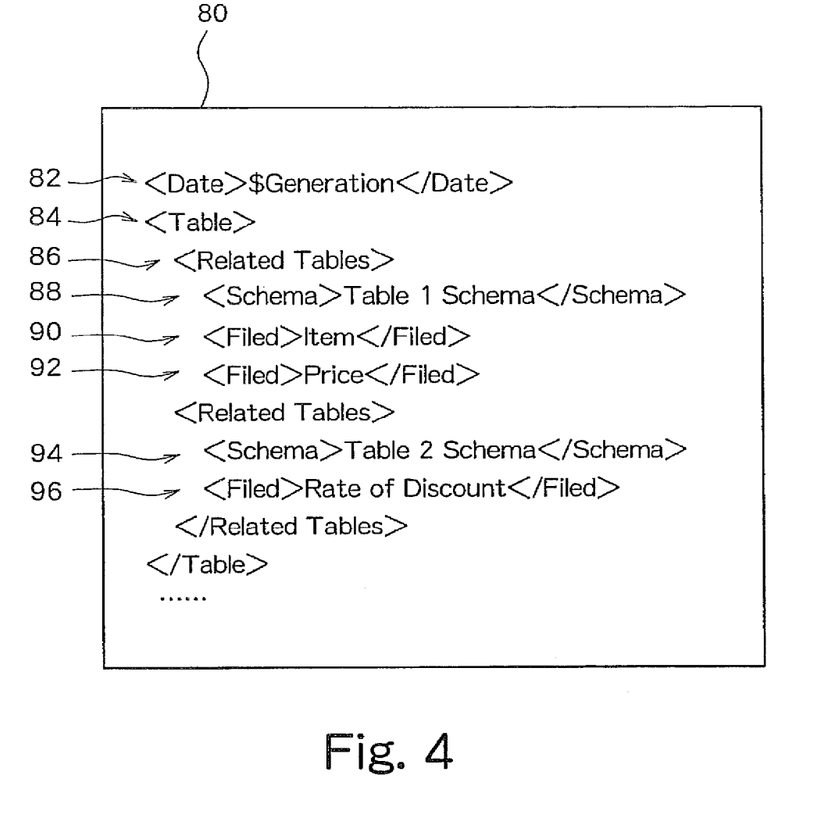
FIG. 4 shows an electronic data structure of the quote form.

FIG. 4 shows an electronically generated form 80 written in markup language with multiple tags for defining structures. On a first line 82, for example, "$Generation" is embedded within a "Date" tag representing a date, thereby defining substitution of the present time of a computer into the corresponding field during generation of the quote. A line 84, on the other hand, is a declarative part in which a start of a table is declared using a "Table" tag for defining the table, while a line 86 declares a start of related tables using a "Related Tables" tag for defining a part of the table. Further, a line 88 defines that the related tables follow a schema named "Table 1 Schema". Lines 90 and 92 declare variables designated as "Item" and "Price" and define that corresponding values are assigned to the variables. Similarly, a line 94 defines that the related tables follow a schema designated as "Table 2 Schema," while a line 96 defines that a value is assigned to a variable designated as "Rate of Discount."

Figure 5:
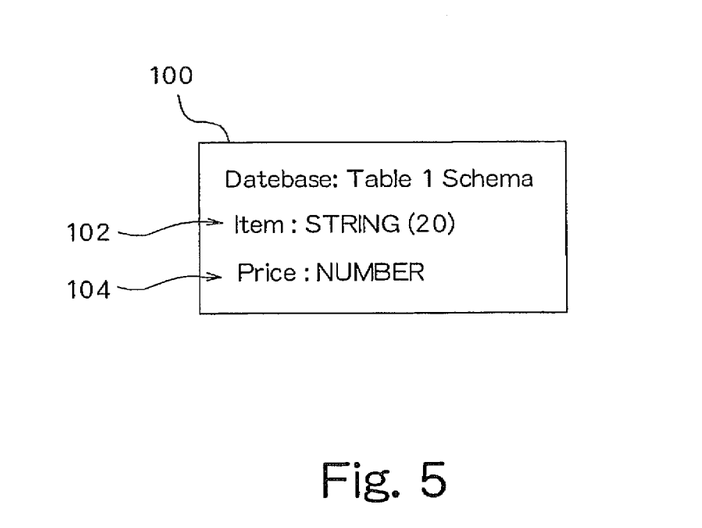
FIG. 5 shows a database for defining variable types of the quote form shown in FIG. 4.
Figure 6:
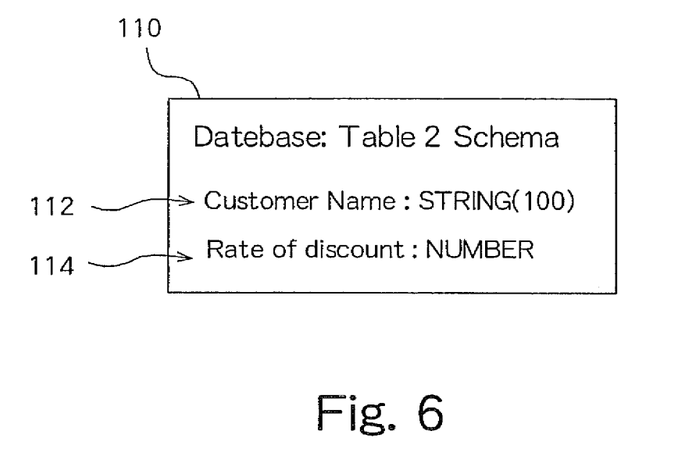
FIG. 6 shows another database for defining variable types of the quote form shown in FIG. 4.

FIG. 5 shows an example of a database 100 for specifying the schema "Table 1 Schema" defined on the line 88 of FIG. 4. FIG. 6 shows an example of a database 110 for specifying the schema "Table 2 Schema" defined on the line 94 of FIG. 4. As can be seen from FIG. 5, in the scheme "Table 1 Scheme," the type of the variable "Item" is defined as "STRING" being a string composed of 20 characters, and the type of the variable "Price" is defined as "NUMBER" being a numerical figure. Further, as can be seen from FIG. 6, in the schema "Table 2 Schema," the type of the variable "Customer Name" is defined as "STRING" being a string composed of 100 characters, and the variable "Rate of discount" as "NUMBER" being a numerical figure.

Figure 7:
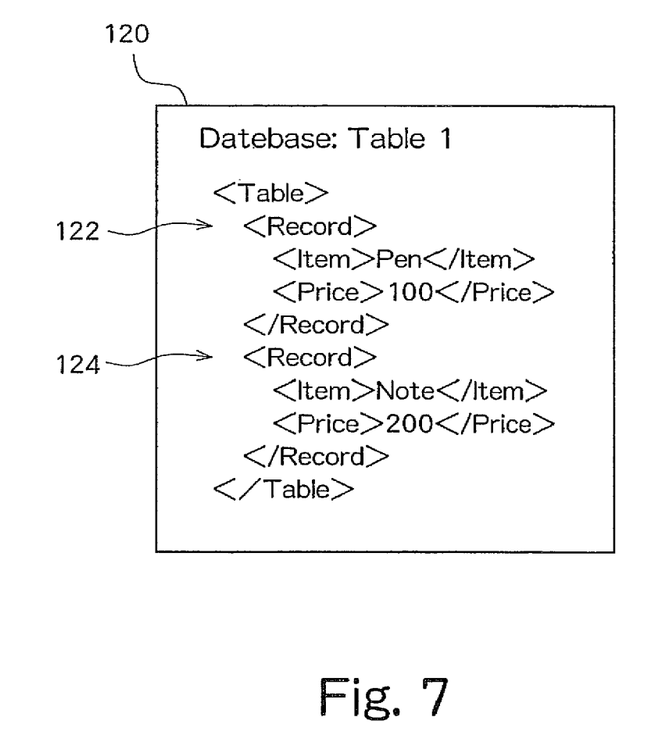
FIG. 7 shows a database storing values to be assigned to fields in the quote form of FIG. 4.

FIG. 7 is a drawing for explaining a database 120 storing assignment value candidates to be assigned to the variables used in the schema "Table 1 Schema." In the database 120, multiple values are defined by a "Record" tag 122 in which a string "Pen" is specified as a value assigned to the variable "Item," and a number "100" is specified as a value assigned to the variable "Price." Further, in a "Record" tag 124, a string "Note" is specified as a value assigned to the variable "Item," and a number "200" is specified as a value assigned to the variable "Price."

Figure 8:
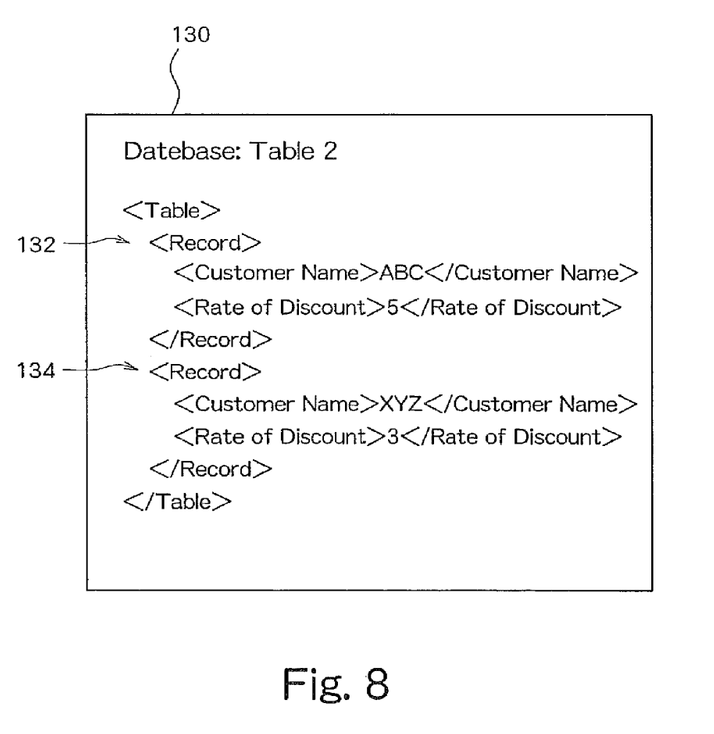
FIG. 8 shows another database storing values to be assigned to fields in the quote form of FIG. 4.

Similarly, a database 130 shown in FIG. 8 stores value candidates to be assigned to the variables in the schema "Table 2 Schema." Specifically, in a "Record" tag 132, a string "ABC" is specified as a value for "Customer Name," and a number "5" is specified as a value for corresponding "Rate of Discount." In a "Record" tag 134, a string "XYZ" is specified as a value for "Customer Name," and a number "3" is specified as a value for corresponding "Rate of Discount."

The form 80 shown in FIG. 4 corresponds to the form 26 stored in the repository 24 of FIG. 1. The databases 100, 110, 120, and 130 shown in FIGS. 5 to 8 correspond to the database 20 shown in FIG. 1. In other words, to generate a new quote, the processing server 14 obtains the form 80 from the repository 24, and maps specific values on the form 80 while referencing the databases 100, 110, 120, and 130. In this manner, the new quote having specific product names and prices posted thereon is generated. Although the exemplary embodiment has been described by using the quote as an example, such a form may be constructed for various business statements or reports and various other business documents.

Figure 9:
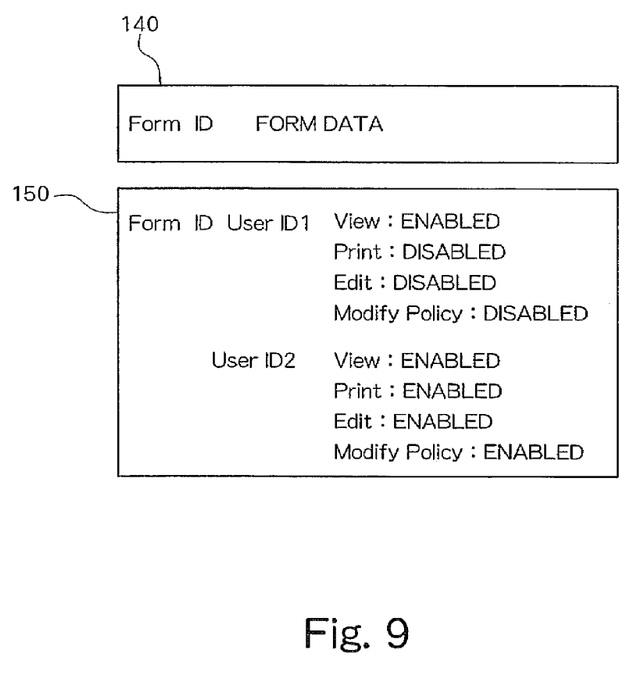
FIG. 9 shows an example of a security policy established for the quote form of FIG. 4.

Here, by reference to FIG. 9, an example of a security policy established for the form will be described. FIG. 9 is a conceptual diagram showing the state of security policy being set. Data 140 represents settings of "Form ID" used as identification information of a form, such as the form 80 shown in FIG. 4. The "Form ID" may be embedded visibly or invisibly in the form, or may be configured as a file name of the form. In terms of security enhancement, the "Form ID" should be configured so as to prevent easy tampering by an outsider. Accordingly, the "Form ID" is generally protected by means of cryptography or other techniques.

Data 150 shown in FIG. 9 contain information established as a security policy. In the security policy, "Form ID" for each form is written to indicate an electronic document for which the security policy is specified. To enable setting of individual security levels for each user or for each user group, user names, such as "User ID1" and "User ID2," are written in conjunction with their respective conditions as to whether viewing is enabled or disabled, whether editing is enabled or disabled, and whether modifying policy is enabled or disabled. Because the data 150 are managed by the policy management server, user rights to a pertinent form may be found by sending the "Form ID" and "User ID" to the policy management server for a query.

By reference to FIGS. 10 to 14, operation of the electronic document management system 10 shown in FIG. 1 will be described below. In addition to functioning as an electronic document generating apparatus for generating a new electronic document based on the form, the electronic document management system 10 also functions as an electronic document managing apparatus for managing an access to the generated new electronic document. In the below description, a generation process of an electronic document is explained with reference to FIGS. 10 to 13, and a management process of the electronic document is explained with reference to FIG. 14.

Figure 10:
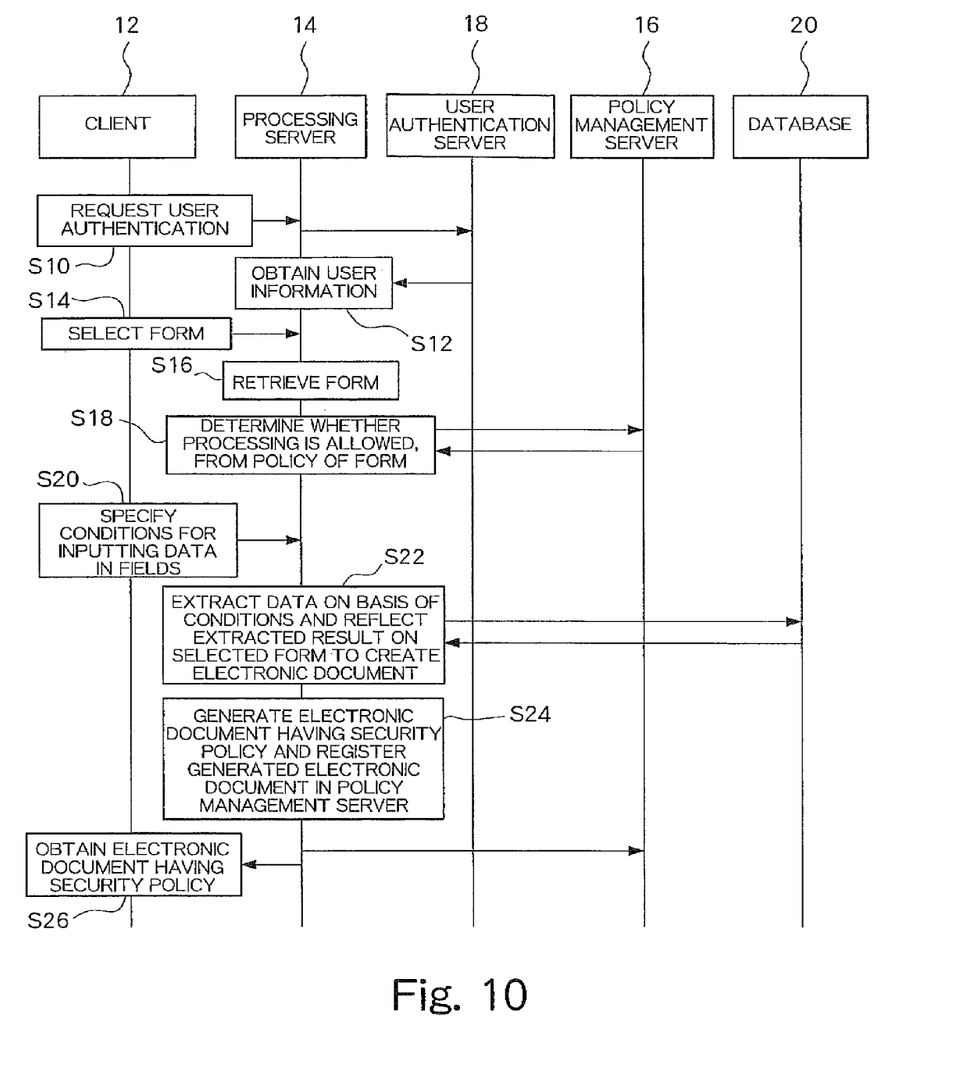
FIG. 10 is a sequence diagram showing an example process for generating an electronic document.

FIG. 10 is a sequence diagram for explaining process steps of generating a new electronic document based on the form. In FIG. 10, the process steps are sorted for each component of the client 12, the processing server 14, the user authentication server 18, the policy management server 16, and the database 20 and depicted in connection with the components.

The client 12 undergoes user authentication to access the processing server 14 (S10). More specifically, user information is sent from the client 12 to the processing server 14, and a request for authentication is issued from the processing server 14 to the user authentication server 18. Upon receipt of the request, the user authentication server 18 performs user authentication and returns a result of the user authentication to the processing server 14 (S12). Then, operation for generating an electronic document is initiated, and information on a selected form is sent from the client 12 to the processing server 14 (S14). The processing server 14 retrieves the selected form from the repository (S16), and inquires the policy management server 16 as to whether or not a user who uses the client 12 has the right to generate a new electronic document based on the selected form (S18). When the user has the right, in addition to a reply indicating that the user has the right, data necessary for unlocking the key (which may be implemented by password setting or cryptography, for example) set to the electronic document are provided, to continue operation. Further, conditions for assigning values to the cells and fields of the form are input (S20).

In the processing server 14, data are extracted from the database 20 on the basis of the input conditions, and extracted results are reflected onto the selected form, to thereby generate the electronic document (S22). Next, in addition to embedding identification information in the generated electronic document, a security policy inheriting a security policy associated with the source form is generated under a name of the identification information and defined in the policy management server 16 (S24). In other words, the security policy established for the generated electronic document is configured to incorporate the contents of security policy for the source form used as a template by referencing the security policy for the source form. Further, a key for ensuring a suitable level of security corresponding to the security policy is set to the generated electronic document as needed. As a result, the electronic document to which the security policy having the contents identical with those of the source form is established is generated and output to the client 12 (S26). It should be, of course, understood by a person skilled in the art that the generated electronic document may be sent to an outsider via e-mail, may be stored in the repository, or may be printed in the image forming apparatus.

Figure 11:
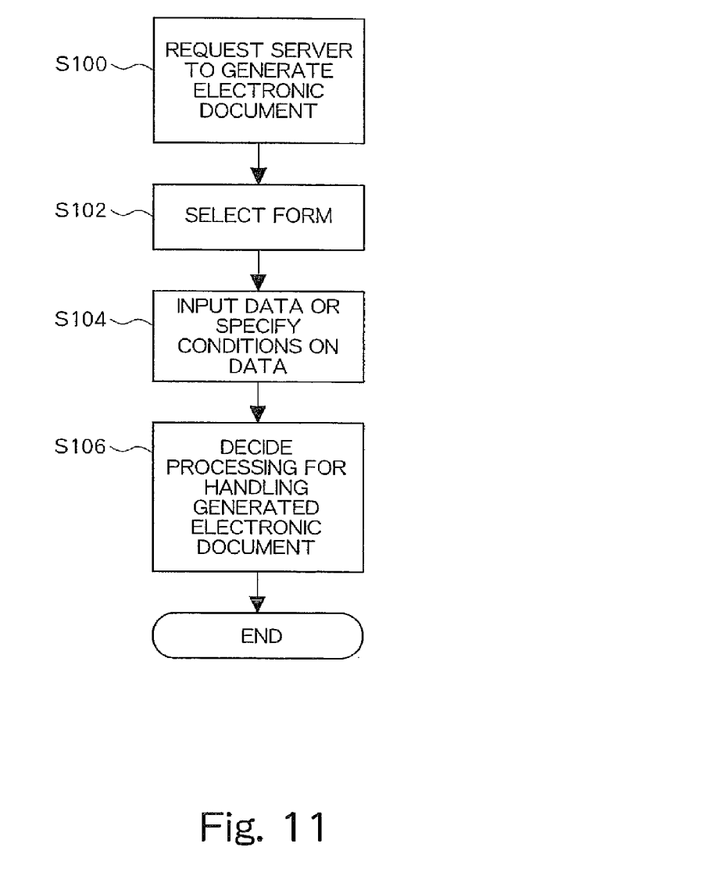
FIG. 11 is a flowchart showing an example of user operation for generating an electronic document.

By reference to the flowchart of FIG. 11, a flow of user instructions provided in the process depicted in FIG. 10 will be described in further detail. The user sends a request for generating a new electronic document to the processing server 14 (S100), and selects a desired one of prestored forms (S102). Next, the user directly enters data in the fields of the selected form, or specifies conditions for input based on the database (S104). Consequently, the new electronic document is generated, and a security policy inheriting a security policy set to the selected form is established for the generated electronic document without further instructions being input from the user. However, in a case where a condition of permitting a modification to the security policy is defined in the security policy for the source form, the user may be given an opportunity to make the modification to the security policy. To perform processing of some kind on the generated electronic document, the user provides an instruction for the processing to the processing server 14 (S106). To print the electronic document, for example, the user specifies print settings, indicates an image forming apparatus to which the electronic document is to be sent, and issues a request for printing to the processing server. On the other hand, to store the electronic document in a repository, the user selects a desired repository to which the electronic document is to be sent and stored, specifies a destination address if the electronic document is sent via e-mail, and requests the processing server to perform transmission and storage processing.

Figure 12:
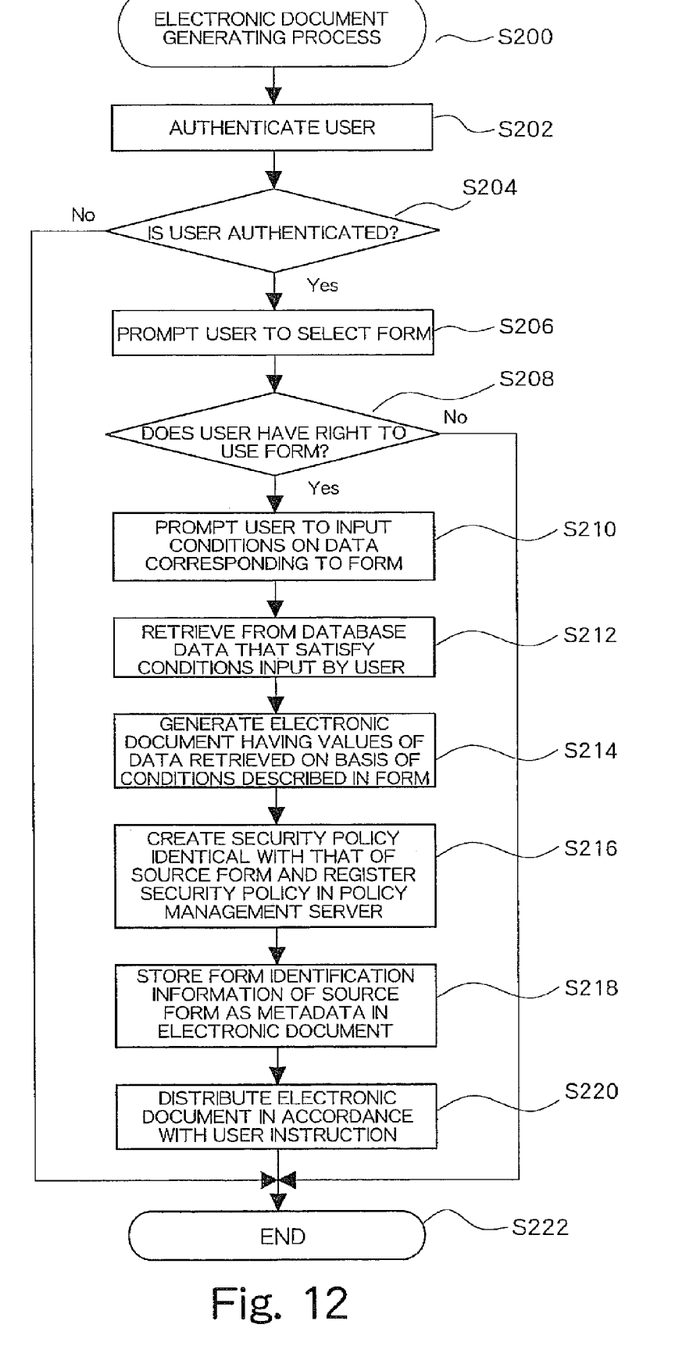
FIG. 12 is a flowchart showing an example of process steps performed by apparatuses to generate an electronic document.

The flowchart of FIG. 12 shows a flow of processing performed on a system side in the process depicted in FIG. 10. In an electronic document generating process (S200), the user authentication server 18 performs user authentication (S202, S204) to authenticate a user. When the user is not authenticated, the process is terminated (S222). On the other hand, when the user is authenticated, the user is prompted to select a form to be used (S206). Upon selection of the form, whether the user has the right to use the form is verified by reference to the security policy registered in the policy management server 16 (S208). When the user does not have the right, the process is terminated (S222), whereas, when the user has the right, the user is prompted to define conditions to input data in the fields and cells of the form (S210). Then, data that satisfy the defined conditions are retrieved from the database 20 (S212), and the retrieved data are input in the fields and cells of the form to generate a new electronic document (S214).

Next, the security policy for the generated electronic document is registered in the policy management server 16 (S216). At the registration, identification information used for associating the electronic document with the security policy is stored as metadata in the electronic document, while the same identification information is explicitly written in the security policy to be registered, the electronic document and the security policy are mutually associated through the identification information. Further, the electronic document is entirely locked by means of a key for ensuring a suitable level of security defined according to the security policy, as appropriate. For example, the whole electronic document may be encrypted by use of a password, in order to prevent users who do not have the password from viewing the electronic document. In addition, form identification information to identify the source form used for generating the electronic document is stored as metadata in the electronic document (S218), which is one effective method for referencing a security policy corresponding to the form identification information to inherit the contents of the security policy. Alternatively, instead of storing the form identification information in the electronic document, a setting for referencing the security policy of the source form to inherit the contents of the security policy may be defined to the registered security policy. At a final stage of this process, distribution or other processing of the generated electronic document is performed in accordance with user instructions (S220).

Figure 13:
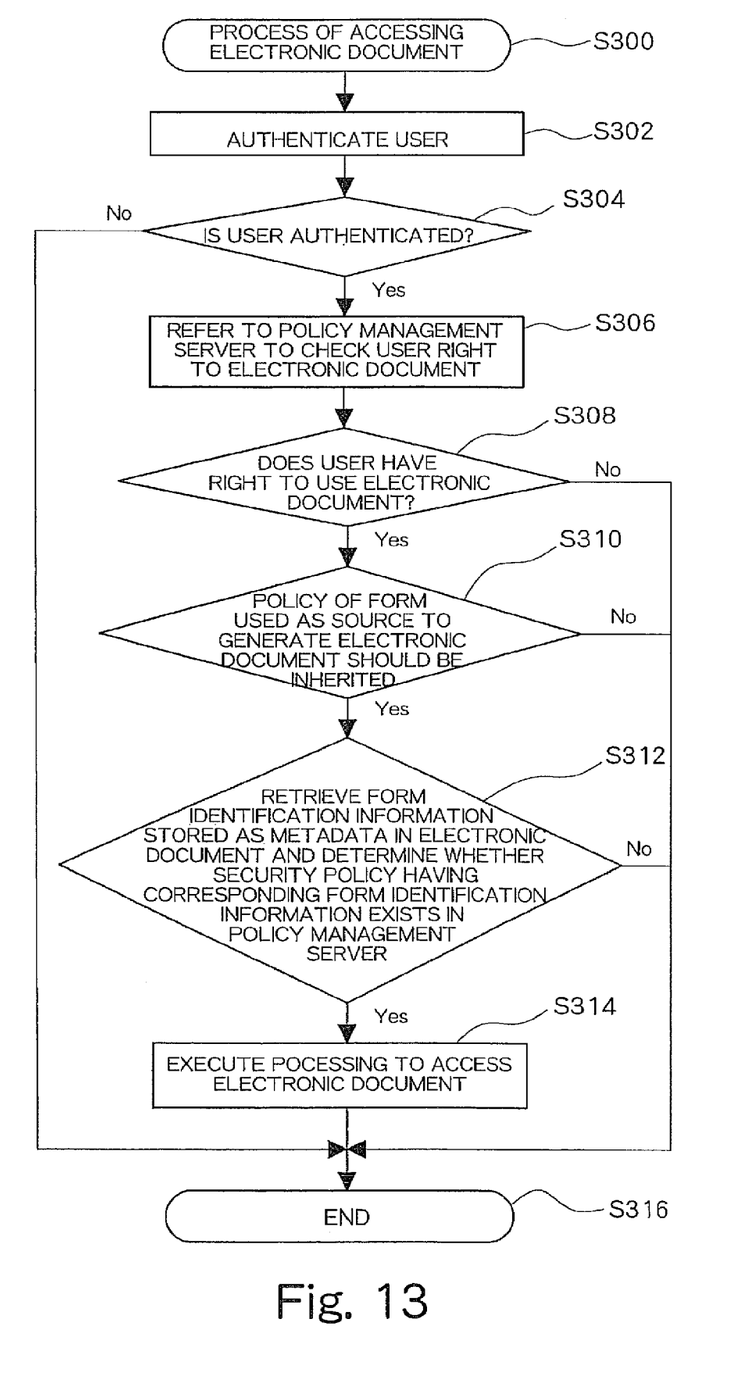
FIG. 13 is a flowchart showing an example of process steps for using an electronic document.

FIG. 13 shows a flowchart for explaining a process for using the generated electronic document. When an attempt to access the electronic document is made (S300), the user authentication server 18 authenticates a user who has made the attempt (S302, S304). When the user is not authenticated, the process is terminated (S316). On the other hand, when the user is successfully authenticated, rights of the user granted for the electronic document are checked in the policy management server 16 (S306). More specifically, the policy management server 16 finds a security policy corresponding to the identification information embedded in the electronic document, so as to determine whether or not the user has an operation right corresponding to a usage mode to be performed by the user (S308). Upon determination of presence of the operation right, it is further examined whether or not the setting to inherit the security policy for the source form used for generating the electronic document is established (S310). When the setting to inherit the security policy is established, the form identification information stored as metadata in the electronic document is retrieved, so as to find a security policy including form identification information corresponding to the retrieved form identification information in the policy management server (S312). When the security policy corresponding to the retrieved form identification information is found, accesses to the electronic document are granted on the basis of the operation right defined in the found security policy (S314).

Various exemplary embodiments of the present invention will be described in the manner of a summary. It should be noted that the following description regarding some of the embodiments includes an overlap with the above description.

An electronic document generating apparatus according to this exemplary embodiment may be implemented by hardware, such as a PC or a multi-function machine (having multiple image processing functions, such as printing) provided with a computing function and software for defining operation of the hardware. The electronic document generating apparatus may be configured to incorporate multiple hardware devices physically separated from each other. An electronic document refers to a document represented by electronic data, and the term "document" refers to a general document in a broad sense encompassing not only a text-based document but also a document constructed of a chart or an image. A source electronic document refers to an electronic document functioning as a template, which may be referred to as a form, form data, or format data. No specific limitation is imposed on a format defined by the source electronic document, and a subject to be defined may include text data, table settings, layout, and other various matters. A variable area formed in the source electronic document is an area where a value for generating an individual electronic document is entered. The variable area is often divided into multiple subareas (fields). The value to be entered in the variable area may be characters (representing, for example, a name, an address, a designation of product, or URL), a numerical value (such as, for example, a date, a quantity, or a price), an image (for example, a portrait or a photograph of a product), or voice data.

A generating unit assigns the value to the variable area in the source electronic document to generate a new electronic document. A setting unit establishes security policy information to the generated new electronic document. The security policy information is data in which an operation right to the corresponding electronic document is defined. As an example of the operation right, a right to directly handle the electronic document, such as a read right, a write right, a copy right, or a print right; a right to scan a printed document; and a right to change the security policy information may be named. The security policy information is established in accordance with security policy information associated with the source electronic document. More specifically, at least a part of the security policy information to be newly established is generated by incorporating at least a part of the security policy information of the source electronic document. The security policy information to be newly established is associated with the generated electronic document in a state separated from the electronic document. In other words, the security policy information is generated not integrally with the electronic document but independently of the electronic document. Accordingly, the security policy information can be managed in the policy management server or the like.

According to the above-described configuration, the security policy information for the new electronic document is generated on the basis of the security policy information for the source electronic document used as the template, which can bring about a reduction in user workload for establishing the security policy information. Such reduction is greatly beneficial especially in generation of various types of electronic documents. Further, because the security policy information is managed separately from the electronic document to be generated, processing, such as a modification to the security policy information, can be easily performed.

In another exemplary embodiment of the electronic document generating apparatus according to the present invention, the security policy information associated with the source electronic document may be copied in its entirety or in part to thereby establish new security policy information for the generated electronic document in the setting unit. In other words, a part or the whole of the security policy information for the generated electronic document is formed of a partial or entire copy of the security policy information for the source electronic document.

In still another exemplary embodiment of the electronic document generating apparatus according to the present invention, the security policy information for the source electronic document is partially or completely inherited as the security policy information for the generated electronic document, to thereby establish the security policy information in the setting unit. The term "inherit" used in this specification is a concept similar to that used in object-oriented programming. Specifically, a part or all of the security policy information for the source electronic document is regarded as a base class, and security policy information for the electronic document to be generated is established as a derived class which references the base class. As a result, the security policy information for the source electronic document is incorporated as the security policy information for the electronic document to be generated without being changed. The security policy information for the electronic document to be generated may be established by adding information to the security policy information for the source electronic document or modifying the security policy information for the source electronic document, as appropriate.

In this exemplary embodiment, because the security policy information for the new electronic document is linked to the security policy information for the source electronic document, changes to the security policy information for the source electronic document will be immediately reflected on the security policy information for the new electronic document. Accordingly, an operation for simultaneously invalidating various electronic documents generated from the same source electronic document can be easily performed. Further, a variety of inheritance settings may be implemented. As an example, a setting to reference the security policy information for the source electronic document may be defined in the security policy information for the new electronic document. In another example, identification information of the source electronic document may be stored in the new electronic document, to directly associate the new electronic document with the security policy information for the source electronic document.

In a further exemplary embodiment of the electronic document generating apparatus according to the present invention, the source electronic document is a form which defines a format for an electronic business statement or report, while the electronic document to be newly generated is the electronic business statement or report. The business statement or report represents an account book, a sales slip, or a like document. As a specific example of the form, the business statement or report may be a receipt slip, a payment slip, a quote, an invoice, or a pay slip. Because a standardized format is usually applied to the business statement or report, it is advantageous that a new electronic business statement or report be generated from the source electronic document serving as a template. Further, because critical business information is often written in the business statement or report, it is desirable to set the security policy information. In addition, in consideration of issuing business statements or reports in large quantity, it is further desirable that the security policy information be easily set. Thus, the electronic document generating apparatus can be advantageously employed in generating electronic business statements or reports.

The foregoing description of the exemplary embodiments of the present invention has been provided for the purposes of illustration and description, and is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An electronic document generating apparatus comprising:
   a generating processor that merges variable data with a source electronic document to generate an electronic document, the source document being a form to provide a format for the generated electronic document; and
   a setting processor that establishes security policy information including identification information and defining an operation right to the generated electronic document, on the basis of security policy information associated with the source electronic document and defining an operation right to the source electronic document, and associates the established security policy information with the generated electronic document by adding the identification information included in the established security policy information to the generated electronic document;
   said setting processor registering, independently of the generated electronic document, the established security policy information in a policy management sever.

2. The electronic document generating apparatus according to claim 1, wherein the setting processor partially or completely copies the security policy information associated with the source electronic document to establish the security policy information for the generated electronic document.

3. The electronic document generating apparatus according to claim 1, wherein in the setting processor, the security policy information associated with the source electronic document is partially or completely inherited as the security policy information for the generated electronic document, to establish the security policy information for the generated electronic document.

4. The electronic document generating apparatus according to claim 1, wherein the source electronic document is a form defining a format for an electronic business statement or report, and the generated electronic document is the electronic business statement or report.

5. The electronic document generating apparatus according to claim 2, wherein the source electronic document is a form defining a format for an electronic business statement or report, and the generated electronic document is the electronic business statement or report.

6. The electronic document generating apparatus according to claim 3, wherein the source electronic document is a form defining a format for an electronic business statement or report, and the generated electronic document is the electronic business statement or report.

7. A storage medium readable by a computer, the storage medium storing a program of instructions executable by the computer to perform a generation process for generating an electronic document, the generation process comprising:
   merging variable data with a source electronic document to generate an electronic document, the source document being a form to provide a format for the generated electronic document;

establishing security policy information including identification information and defining an operation right to the generated electronic document, on the basis of security policy information associated with the source electronic document and defining an operation right to the source electronic document, and associating the established security policy information with the generated electronic document by adding the identification information included in the established security policy information to the generated electronic document; and registering, independently of the generated electronic document, the established security policy information in a policy management server.

8. The storage medium according to claim 7, wherein in the establishing, the security policy information for the generated electronic document is established by partially or completely copying the security policy information associated-with the source electronic document.

9. The storage medium according to claim 7, wherein in the establishing, the security policy information associated with the source electronic document is partially or completely inherited as the security policy information for the generated electronic document.

10. The storage medium according to claim 7, wherein the source electronic document is a form defining a format for an electronic business statement or report, and the electronic document to be generated is the electronic business statement or report.

11. The storage medium according to claim 8, wherein the source electronic document is a form defining a format for an electronic business statement or report, and the electronic document to be generated is the electronic business statement or report.

12. The storage medium according to claim 9, wherein the source electronic document is a form defining a format for an electronic business statement or report, and the electronic document to be generated is the electronic business statement or report.

13. An electronic document generating method, comprising:

merging variable data with a source electronic document to generate an electronic document, the source document being a form to provide a format for the generated electronic document;

establishing security policy information including identification information and defining an operation right to the generated electronic document, on the basis of security policy information associated with the source electronic document and defining an operation right to the source electronic document, and associating the established security policy information with the generated electronic document by adding the identification information included in the established security policy information to the generated electronic document; and registering, independently of the generated electronic document, the established security policy information in a policy management server.

14. The electronic document generating method according to claim 13, wherein in the establishing, the security policy information for the generated electronic document is established by partially or totally copying the security policy information associated with the source electronic document.

15. The electronic document generating method according to claim 13, wherein in the establishing, the security policy information associated with the source electronic document is partially or completely inherited as the security policy information for the generated electronic document.

16. The electronic document generating method according to claim 13, wherein the source electronic document is a form defining a format for an electronic business statement or report, and the electronic document to be generated is the electronic business statement or report.

17. The electronic document generating method according to claim 14, wherein the source electronic document is a form defining a format for an electronic business statement or report, and the electronic document to be generated is the electronic business statement or report.

18. The electronic document generating method according to claim 15, wherein the source electronic document is a form defining a format for an electronic business statement or report, and the electronic document to be generated is the electronic business statement or report.

* * * * *